April 5, 1932.  G. A. DALTON ET AL  1,852,957
GEAR
Filed Jan. 19, 1928
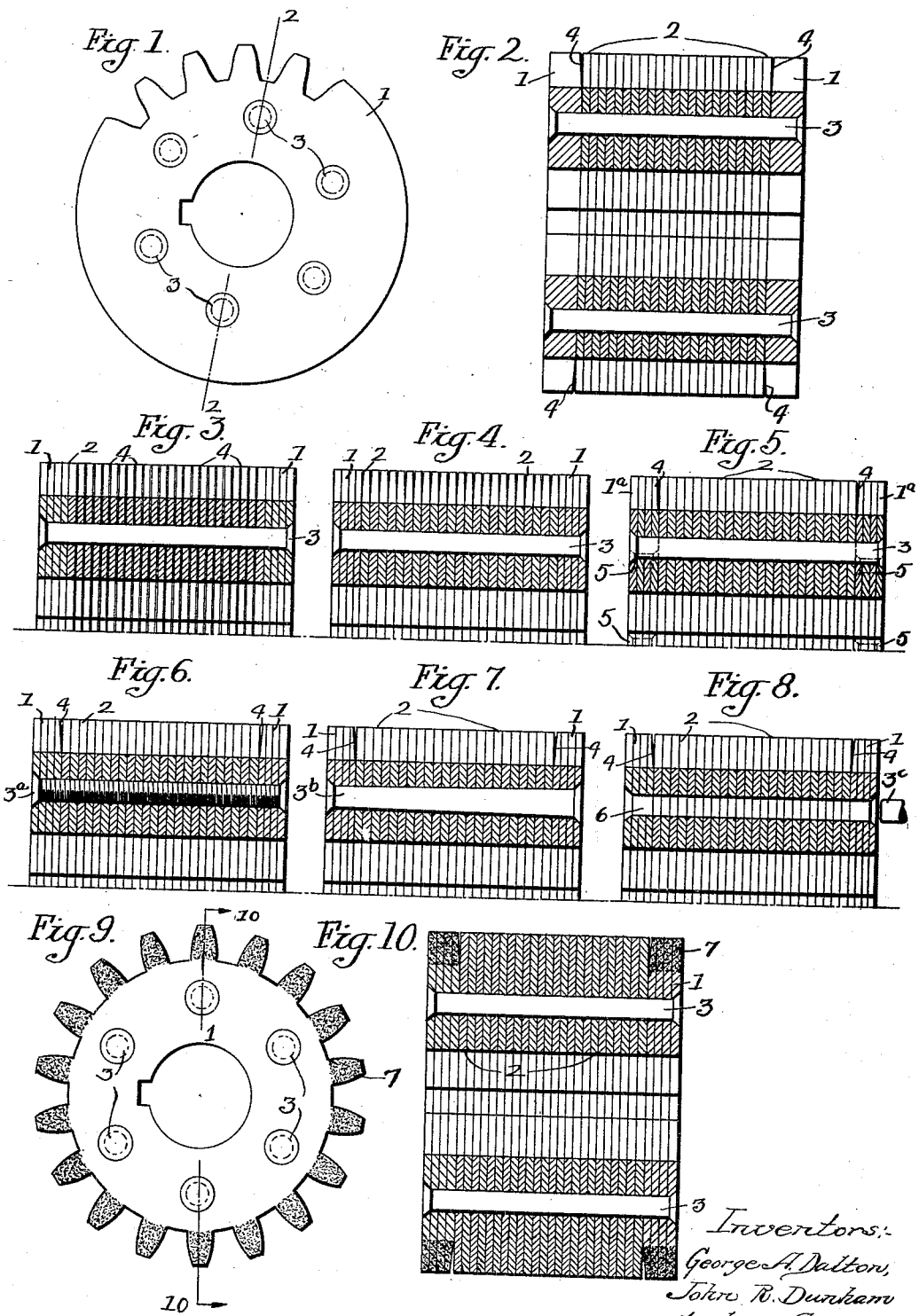
Inventors:
George A. Dalton,
John R. Durham,
by their Attorneys
Howson & Howson Patented Apr. 5, 1932

1,852,957

UNITED STATES PATENT OFFICE

GEORGE A. DALTON AND JOHN R. DUNHAM, OF HIGHLAND PARK, NEW JERSEY

GEAR

Application filed January 19, 1928. Serial No. 247,887.

This invention relates to improvements in gears, and the principal object of the invention is to provide a gear having characteristics of quietness in operation exceeding those of metal gears as made in accordance with the present practices.

More particularly, the invention relates to improvements in gears of the type forming the subject of our copending application, Serial Number 178,264, filed March 25, 1927.

In the attached drawings:

Figure 1 is a side view of a partially formed gear made in accordance with our invention;

Fig. 2 is a section on the line 2—2, Fig. 1;

Figs. 3, 4, 5, 6, 7 and 8, are fragmentary sectional views illustrating modifications within the scope of the invention of the gear shown in Figs. 1 and 2;

Fig. 9 is a side view illustrating a further modified form of gear, and

Fig. 10 is a section on the line 10—10, Fig. 9.

While gears have been made of materials other than metal which are relatively quiet in operation, the metal gears have certain advantages of durability and strength which are essential in certain types of mechanism and are highly desirable under any circumstances. In our copending application mentioned above, we have described a novel form of gear composed entirely of metal and so formed as to materially reduce operating noises. Essentially these gears consist of a laminated structure. We have discovered that by modifying the gears of this type in accordance with certain principles hereinafter set forth, the operating noises may still further be reduced, and, in fact, practically eliminated.

Referring to Figs. 1 and 2, it will be noted that the gear therein illustrated comprises two side plates or shrouds 1, 1, between which are held a plurality of relatively thin disks 2 constituting the main body of the gear. These parts are held together in desirable compression by means in the present instance of rivets 3 passed transversely through the shrouds and through the disks 2. We have discovered that by relieving the transverse pressure upon the disks 2 in the peripheral or toothed portion of this gear, the noises of operation are materially reduced, the gear sacrificing none of the wearing properties of the gear as previously formed. In that embodiment of the invention illustrated in Fig. 2, it will be noted that the inner faces of the shrouds 1 in the peripheral portion are beveled outwardly, as indicated at 4, whereby when the parts are riveted together under forces affording the desired compression in the central or hub portion of the gear, the peripheral or toothed parts are left substantially uncompressed.

Other methods may be employed for obtaining the desired result. We have found, for example, that by introducing between the disks 2 as shown for example at 4 in Fig. 3 a solid lubricant and by thereafter subjecting the peripheral portion of the gear to the effects of a suitable solvent for the lubricant, or by allowing the lubricant at the peripheral portion to become dislodged in normal operation, while the center or hub portions of the gear are retained under a desired pressure, the compression in the peripheral or toothed portion is relieved to an extent materially reducing the noises in operation.

A further practical method of obtaining the desired results is illustrated in Fig. 4, in which the disks 2 are individually slightly beveled in their peripheral portions so as to provide the desired freedom from compression in this portion of the gear.

We have further found that the operating noises may be still further reduced by employing shrouds of special form. Thus for example as illustrated in Figs. 3 to 8 and 10, instead of forming the shrouds of solid relatively heavy metal, we have built up the shrouds in laminated form by securing together in any suitable manner, as by rivets 5, a plurality of relatively thin plates or disks. These laminated shrouds 1a do not possess in the same degree as the solid shrouds the characteristic of ringing under impact, and the noises are correspondingly reduced.

In this laminated type of gear, and particularly in gears of the form described above in which the peripheral portions of the laminated parts are left substantially free from pressure some difficulty has been found in securing the disks together in such manner as to positively prevent slight relative movements. We have found that by utilizing instead of the normal rivets shown in Figs. 2 to 5, inclusive, a threaded rivet 3a, as shown in Fig. 6, the openings in the shrouds and in the disks 2 being correspondingly threaded, the parts may be positively held in fixed rigid relation.

Similar results are obtainable as illustrated in Fig. 7 by use of a rivet 3b of tapered form, the openings through the gear body being correspondingly tapered. By driving the tapered rivet firmly into place in the riveting operation, the various elements of the gear body are bound closely together.

Similar satisfactory results are obtainable as shown in Fig. 8 by use of a plain rivet 3c of diameter slightly greater than the passage 6 through the gear body which receives the rivet, and by forcing the rivet into place by application of the required pressure.

In Figs. 9 and 10, we have illustrated a gear having a preferred form of laminated shroud. In this instance, the shroud laminations are secured together in the peripheral portions by spot welding. Preferably the welded area will extend inwardly to a distance corresponding to the height of the teeth. This materially aids in the teeth cutting operation.

Attention is directed to the fact that when using an arrangement of this character and very thin laminations such as are employed in the construction of the gear, (the ordinary laminations being six thousandths of an inch in thickness) it is possible to employ such thin laminations without danger of the same crushing since the pressure applied at the central portion of the disk; while not placing the laminations at the tooth portions under compression, insures their arrangement in contact so that they afford support to one another without presenting a rigid body resulting in noisy operation. Quite obviously, since the shrouds themselves will have a certain degree of flexibility the compression will decrease from the points at which the rivets 3 are inserted to the peripheral portions of the gear.

There may be still further modifications within the scope of the invention.

We claim:

1. A laminated gear comprising spaced shrouds and a plurality of disks laid face to face and held under desired compression between said shrouds, and means whereby the said disks in the peripheral or toothed portion only of the gear are left substantially free from compression between the shrouds while being maintained in contact with one another and the shrouds.

2. A laminated gear comprising a pair of spaced shrouds, and a plurality of disks closely confined between said shrouds, said shrouds being beveled in the peripheral portion only and on the inner face whereby the binding pressure of the shrouds upon the laminated body is reduced in the peripheral portion of the latter alone while maintaining contact between the disks and between the disks and shrouds in said peripheral portion.

3. A laminated gear comprising a laminated body portion, laminated shrouds arranged at opposite sides of said body, and rivets binding said shrouds and laminated body together the laminations of the shrouds being welded to one another throughout the toothed area.

4. A laminated gear comprising a plurality of thin disks laid face to face, shrouds at opposite sides of said disks and means binding the disks and shrouds firmly together inwardly of the toothed area of the gear, the shrouds in the toothed area being relieved to an extent relieving compression of the toothed portions of the disks while maintaining contact therebetween and between the shrouds and the adjacent disks.

5. A laminated gear comprising a plurality of thin disks laid face to face, shrouds at opposite sides of said disks and means binding the disks and shrouds firmly together inwardly of the toothed area of the gear, the shrouds in the toothed area being relieved to an extent relieving compression of the toothed portions of the disks while maintaining contact therebetween, said shrouds comprising laminæ welded to one another in the toothed area of the gear.

GEORGE A. DALTON.
JOHN R. DUNHAM.